(No Model.)

M. PFATISCHER.
DYNAMO ELECTRIC MACHINE.

No. 421,967. Patented Feb. 25, 1890.

Witnesses
Geo. W. Breck.
Edward Thorpe.

Inventor
Mathias Pfatischer
By his Attorney W. B. Vansize

UNITED STATES PATENT OFFICE.

MATHIAS PFATISCHER, OF PHILADELPHIA, PENNSYLVANIA, ASSIGNOR TO THE ELECTRICAL ACCUMULATOR COMPANY, OF NEW YORK.

DYNAMO-ELECTRIC MACHINE.

SPECIFICATION forming part of Letters Patent No. 421,967, dated February 25, 1890.

Application filed November 15, 1889. Serial No. 330,383. (No model.)

*To all whom it may concern:*

Be it known that I, MATHIAS PFATISCHER, a citizen of the United States, residing in the city of Philadelphia, in the State of Pennsylvania, have invented certain new and useful Improvements in Dynamo-Electric Machines or Motors, of which the following is a specification.

The invention consists in the combination of carbon and metal brushes with the commutator, forming a part of the armature, whereby the wear and deterioration incident to the use of metal alone is avoided. I prefer to take two carbon brushes and two copper brushes and arrange them at diametrically-opposite points and in parallel planes, a carbon brush and a copper brush diametrically opposite being in one plane and alternating with a copper brush and a carbon brush diametrically opposite in a parallel plane, so that on one side of the commutator there will be a carbon brush and a copper brush in contact with any given commutator-section, and upon a diametrically-opposite side there will be a copper brush and a carbon brush in contact with a diametrically-opposite commutator-section.

Carbon brushes are old and copper brushes are old; but I have found that in the use of carbon frequent breakage and fracture occurs, and that the contact-resistance between a carbon brush and the commutator is much higher than between a copper brush and the commutator; but, on the other hand, a carbon brush much more readily acquires a nice polishing-surface, the wearing being on the brush alone and not on the commutator, while in the case of copper brushes a low contact-resistance and high conductivity are assured, but with the disadvantage of cutting both the brush and the commutator if not carefully manipulated. By having a carbon brush on the opposite side to the copper brush the particles of carbon which wear off act as a lubricant for the copper brush, and thus avoid the evil effects of grinding the commutator, which frequently occurs in the use of the copper brush alone. Thus in the combination the carbon keeps the commutator polished with little or no attention, and the use of the copper brush preserves the high conductivity essential to efficiency. Moreover, in case a carbon brush should break the circuit will be maintained by the copper brush until the carbon brush can be replaced.

The accompanying drawings illustrate my invention.

Figure 1:
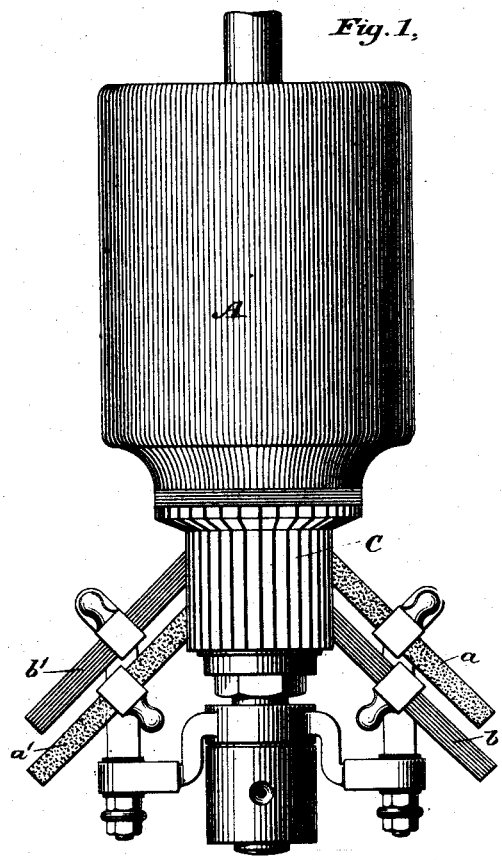
Figure 3:
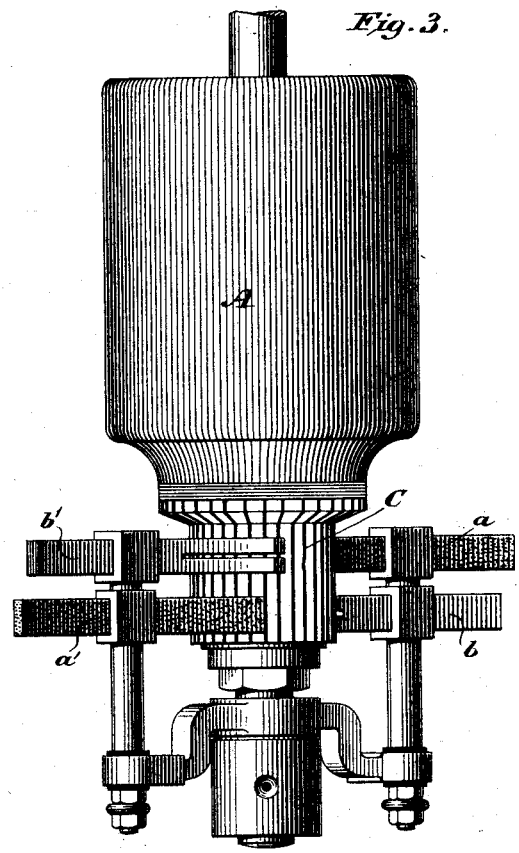
Figure 2:
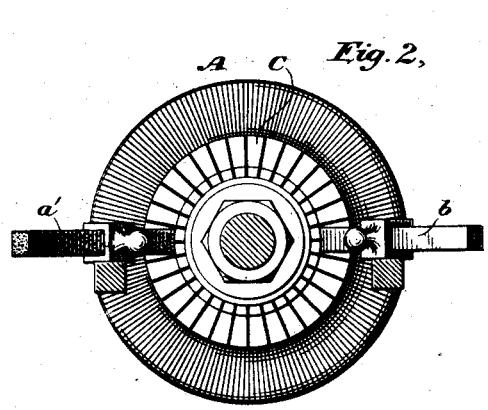
Figure 4:
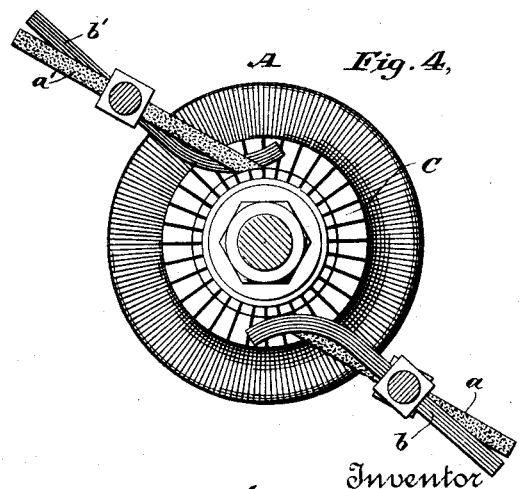

Figure 1 shows an arrangement of combined carbon and copper brushes having their ends beveled and in contact with the commutator. Fig. 2 is an end view of the same arrangement. Fig. 3 shows the same arrangement of brushes having a surface-contact, and Fig. 4 is an end view of the same.

A is an armature, which may be for use in either a dynamo-machine or in an electro-magnetic motor.

C is the commutator, composed of a series of insulated sections.

$a$ is a carbon commutator-brush and $b$ is a copper commutator-brush, making contact with the commutator C in parallel planes, but at different points in the length of the commutator. $a'$ is a similar carbon brush and $b'$ is a similar copper brush. Brushes $a'$ and $b'$ make contact with the commutator on diametrically-opposite lines with respect to $a$ and $b$. Carbon brush $a$ and copper brush $b'$ are exactly opposite. Carbon brush $a'$ and copper brush $b$ are also exactly opposite. The brushes are suitably secured in position by any of the well-known devices for removably holding such brushes in position. Brushes $a$ and $b$ are connected to one terminal of the circuit, and brushes $a'$ and $b'$ are connected to the other terminal of the circuit. The comparatively high contact-resistance of the carbon brush $a$ is greatly reduced by the copper brush $b$. The same is true of the carbon brush $a'$ and the copper brush $b'$.

What I claim, and desire to secure by Letters Patent, is—

1. In a dynamo-electric machine or motor, the rotary armature and a commutator therefor, combined with one or more bars or brushes composed of carbon and one or more bars or brushes composed of metal, substantially as described.

2. In a dynamo-electric machine or motor, a rotary armature and a commutator therefor, combined with a carbon brush and a metal brush making contact at different circumferential points, substantially as described.

3. In a dynamo-electric machine or motor, the combination of a rotary armature, a commutator therefor, a copper brush and a carbon brush making contact with the commutator at the same commutator-section but in separate planes, with a second carbon brush and a second copper brush making contact with the commutator at the same commutator-section with respect to each other but at different commutator-sections with respect to the first-named brushes, substantially as described.

M. PFATISCHER.

Witnesses:
H. N. WEIDNER,
L. T. PAUL.